Dec. 7, 1937.  E. L. FONSECA  2,101,735

SELF COMPENSATING HEAT REGULATOR

Filed Nov. 17, 1931

INVENTOR
Edward L. Fonseca
BY
Pennie, Davis, Marvin & Edmonds
ATTORNEYS

Patented Dec. 7, 1937

2,101,735

UNITED STATES PATENT OFFICE 2,101,735

SELF-COMPENSATING HEAT REGULATOR

Edward L. Fonseca, Newark, N. J., assignor to The Wilcolator Company, Newark, N. J., a corporation of Delaware Application November 17, 1931, Serial No. 575,525

27 Claims. (Cl. 236—15)

This invention relates to a heat regulator and has particular reference to a regulator for controlling the temperature within the oven of a gas range.

Several new designs of gas ranges have recently been developed and are now being produced by many gas stove manufacturers. These new ranges are known as console and table top ranges and are distinguished from the former high oven ranges by the lower disposition of the oven in respect to the open burners of the stove, so that the top of the oven lies only a few inches above the open stove burners. This arrangement allows but little room on the side wall of the oven adjacent the open stove burners for the oven regulator, which is usually mounted at that point.

Moreover, if the thermostatic heat regulator is mounted in the usual place on the inner wall of the oven, its adjusting handle projects over the adjacent stove burners so as to interfere with the free movement of cooking utensils and be liable to injury by being struck by the cooking utensils. The thermostat of the regulator is also affected by the heat of the exterior burners of the range and responds thereto by moving the fuel valve toward open or closed position, so that the temperature of the oven does not remain as constant as it should, but fluctuates, frequently between relatively wide limits, depending upon the construction of the range and the relative positions of the regulator and the exterior burners. Also, the adjusting handle of the thermostatic heat regulator lies in the heat zone of the nearest stove burner and is affected by conducted and reflected heat and accordingly frequently becomes too hot to adjust comfortably. In addition, there is the possibility that the clothing of the user may become ignited in reaching over the adjacent stove burner for the purpose of adjusting the thermostatic regulator. These difficulties were not encountered in the former high oven ranges, since the thermostatic regulators could be placed at a substantial height above the open stove burners so as to be out of the way, although even in these arrangements the action of the thermostat is affected by the extraneous temperatures of the exterior burners, causing the temperature of the oven to fluctuate.

In accordance with this invention a heat regulator is provided which has universal application on any type of gas stove, oven or range, whether of the tabletop, console or high oven types, without interference with the convenient operation of the stove, oven or range, and which automatically compensates for the effects of local or extraneous heat on the thermostatic action of the regulator to maintain the proper oven temperature at all times and under all operating conditions.

The new regulator of this invention includes two thermostats, one responsive to the heat of the oven for regulating the temperature thereof, and the other responsive to extraneous temperatures which affect the operation of the oven thermostat, this second thermostat being arranged to compensate for the effects of the extraneous temperatures on the oven thermostat so that the latter is in effect shielded from disturbance by the extraneous temperatures and accordingly does not fluctuate but maintains the temperature of the oven constant.

In a preferred embodiment of the invention, the oven thermostat includes a bulb located in the oven to be regulated. The bulb is connected by a capillary tube to the interior of an expansible and contractible chamber which is mounted in a valve casing in the gas supply line and controls the valve thereof. A thermostatic liquid is sealed in the bulb, capillary tube and variable chamber and expands to expand the chamber and cause the valve to close when the temperature of the oven exceeds a predetermined degree, and contracts to permit the chamber to contract and open the valve to admit more gas to the oven burner when the temperature of the oven is reduced.

Interposed in the operating system of the oven thermostat is a second thermostat which responds to the local heat to the same extent as the thermostatic liquid in the chamber or capillary tube. This second thermostat is arranged to modify the movement imparted to the valve by the thermostatic liquid column by an amount equal to the thermostatic effect of the local heat on the thermostatic column. For example, without the second thermostat, if several open stove burners are turned on suddenly when the oven is on, the local heat developed thereby will heat and thus expand the thermostatic liquid column at some point, so that a false movement, not represented by any temperature change in the oven, will be imparted to the valve. The second thermostat compensates for this false movement by contracting an amount equal to that which the thermostatic liquid column expands in response to the local heat, so that the valve position remains unchanged and is affected only by temperature changes in the oven, as should be the case.

This self-compensating feature permits of mounting the regulator anywhere on any kind of a range, insulated or uninsulated, without regard to the effect of local heat on the thermostatic system. Also, the valve body may be mounted anywhere on the range to suit the convenience of the manufacturer and the user, and the range may be easily assembled and quickly placed in service, since it is only necessary to drill a small hole in the oven wall, either through the insulation or below it for the passage of the capillary tube. Thus, it is not necessary to construct the range to fit the regulator, or to cut large holes through the oven walls or insulation in order to accommodate the regulator, or to make complicated fuel pipe connections. The effectiveness of the oven is accordingly not impaired, the gas pressure is not reduced by complicated fuel pipe connections, and much labor, time and expense in manufacture and installation are saved.

For a better understanding of the invention, reference is made to the accompanying drawing, in which.

Figures 1, 2:
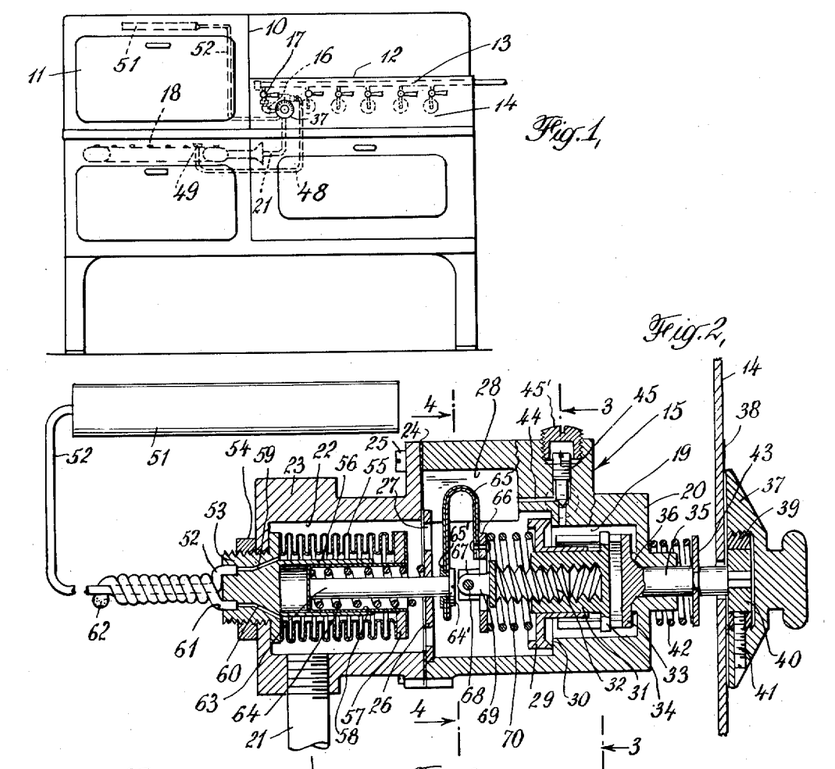
Figure 1 illustrates one way of mounting the new heat regulator of this invention on a gas range of the console type.
Fig. 2 is a longitudinal section through the new regulator as seen along the line 2—2 of Fig. 3.

Referring to Fig. 1 of the drawing, the inner side wall 10 of the oven 11, which is of the style commonly used on console ranges, is only about six inches in height, and while it is possible to mount a compact thermostatic control device, such as a rod-and-tube thermostat, on this inner wall 10, the adjusting handle or other mechanism projecting outside of the wall 10 lies directly above the open burners 12 because of the low height of the wall 10. Accordingly the adjusting handle frequently becomes too hot to handle comfortably. Also, the projecting mechanism of the control device is in the way of and is liable to be injured by cooking utensils placed on the open stove burners 12.

The thermostatic regulator of this invention need not be mounted in the usual place on the inner wall 10 of the range oven 11, but may be located anywhere on the stove and in a more accessible position, where the user can readily reach the adjusting means thereof without reaching over a lighted open stove burner. For example, as illustrated in Fig. 1, the regulator may be located beneath the manifold 13 and open burner top 12 and behind the front panel 14 so that it and all pipe connections are out of sight in conformance to the desire of the stove manufacturer to provide the range with a pleasing and less utilitarian appearance.

As shown in Figs. 1 and 2, the regulator 15 is supported from the manifold 13 by a pipe connection 16, including the usual gas cock 17 for turning on and off the gas supplied to the oven burner 18 from the manifold 13. This pipe connection 16 is connected to the intake chamber 19 of valve body part 20 and a second pipe 21 leads from the outlet chamber 22 of the body part 23 to the oven burner 18. The body parts 20 and 23 are secured together over a gasket 24 by means of tap screws 25 or the like.

Seated in a recess in valve body part 20 and clamped therein between the body parts 20 and 23, is a guide plate 26 having a plurality of holes 27 through which the gas may flow from chamber 28 into outlet chamber 22. Chamber 28 is separated from intake chamber 19 by a disc valve 29, which cooperates with a valve seat 30 formed in valve part 20. This valve 29 is slidable axially on a sleeve 31, which is mounted on and is adjustable axially along a valve stem 32 having a double pitch thread, so that a small angle of rotation of the sleeve 31 on the valve stem 32 effects a substantial axial movement of the valve 29. This rotation of sleeve 31 is effected by a slotted yoke 33 which coacts slidably with keys 34 formed on the sleeve 31. The yoke 33 has an adjusting stem 35 which projects through the end of the valve body part 20 gas tightly, being sealed by a conical joint 36. In the arrangement illustrated, the stem 35 of the adjusting yoke 33 projects through the front panel 14 of the range and carries a knob 37 suitably divided into reference lines provided with numbers or legends indicating various temperatures at which the device may be set, these reference lines being adapted to cooperate with a stationary mark 38 or pointer on the panel 14. This knob 37 preferably consists of composition material moulded on a sleeve 39 which embraces a collar 40 secured to the end of the adjusting stem 35. The knob 37 is locked in the proper calibrated position on the stem 35 by a set screw 41 passing through the sleeve 39 and engaging the collar 40. A spring 42, located between the end of the valve body 20 and a collar 43 mounted on adjusting stem 35, serves to frictionally hold the knob 37 and the adjusting stem 35 in any adjusted position.

A by-pass 44 around the valve 29 is drilled through the valve body part 20 so as to continuously supply the gas outlet chamber 22 with a small amount of gas when the valve 29 is closed. The oven burner 18 is accordingly supplied with a small but continuous supply of gas when the hand cock 17 is open, so that, even if the valve 29 is closed altogether by the thermostat in a manner to be described, the oven burner 18 will not become extinguished. The quantity of gas flowing through the by-pass 44 may be regulated by an adjustable needle valve 45 threaded through the wall of valve body part 20.

Figure 3:
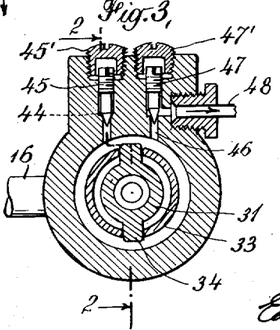
Fig. 3 is a transverse section of the regulator as seen along the line 3—3 of Fig. 2.

Located adjacent the by-pass 44 and its needle valve 45 is a second gas passage 46 and needle valve 47 therefor. This gas passage 46 is connected by a small tube 48 to the pilot burner 49 of the oven burner 18. Through the passage 46 the oven pilot burner 49 is continuously supplied with a small amount of gas which may be regulated by adjusting the needle valve 47. As shown especially in Figs. 2 and 3, both needle valves 45 and 47 are capped with individual plugs 45' and 47' respectively.

Located in the oven at a point which is representative of the temperature thereof is a bulb 51, to which is connected a capillary tube 52 leading from the oven through a small drilled hole located at any convenient point. The capillary tube 52 is preferably formed of a seamless copper tube and may be bent or readily shaped to conform to corners and the like so that it may be led to any point. It is not necessary to drill through the insulation or lining of the oven as the capillary tube 52 may be led through a small hole in the oven wall at a point below the insulation or lining or the like. Accordingly, the insulation of the oven need not be impaired by the installation of the thermostatic regulator as has been the case heretofore, nor is it necessary to adapt the stove for this regulator since it can be mounted in any position on any kind of a range quickly and readily and without cutting large holes therein or making extensive changes in the piping and other connections.

This capillary tube 52 is sealed at its other end in a plug 53, the threaded extension of which is passed through a hole in body part 23 and is secured in place by a nut 54. The plug 53 carries at its inner end a flexible metal bellows 55 which is expansible and contractible mechanically. The contraction and expansion of the bellows 55 takes place around a sleeve 56 which forms part of the plug 53. The other end of the bellows 55 is sealed by a disk 57 having an axial cup 58 which fits slidably within the sleeve 56 of the plug 53. The sleeve 56 and cup 58 occupy the greater proportion of the volume of bellows 55 and thus the expansion and contraction thereof is accomplished by only a small change in its volume. This change in volume of the bellows 55 is effected by a thermally expansible and contractible liquid, that is, by a thermo-responsive fluid which fills the bellows 55, the capillary tube 52 and the bulb 51, and has a high boiling point and negligible vapor pressure at the working temperatures to which it is subjected. The ratio of the liquid volume in the bulb to the liquid volume in the bellows 55 should not be more than two or three to one for the reason that a larger ratio than two or three to one would result in a dangerously large extension of the bellows at high temperatures.

The interior of the bellows 55 is connected by a drilled passage 59 in the plug 53 with the interior of the capillary tube 52. The thermostatic liquid for the system is introduced through a filling passage 60 drilled through plug 53 and connected to a second shorter capillary tube 61. The filling capillary tube 61 is plugged with solder 62 or the like after the filling operation and is then wound spirally around the capillary tube 61 to serve as a protector against injury or breaking off of the fine capillary tube 52 at its joint with the plug 53. Thus the capillary filling tube 61 performs two functions, namely for introducing the liquid into the thermostatic system and for protecting the capillary tube 52.

Secured to the bottom of the cup 58 of the bellows is a push rod 63 which is slidable through a central opening in the guide disc 26. A strong coil spring 64 extends between the bottom of the cup 58 and the guide disc 26 and opposes the expansion of the bellows 55 and, through connections to be described, normally urges valve 29 to open position. Rigidly secured to the free end of the push rod 63, is a bi-metallic thermostat 65, which is preferably formed into an inverted V-shape with the low expanding element on the inside, so that the thermostat 65 contracts in response to increases in temperature and expands in response to decreases in temperature, the contraction bringing the free end toward the stationary end thereof and the expansion spreading the free end away from the stationary end thereof. As shown in Fig. 2, the rod 63 extends through an enlarged opening in thermostat 65 and is rigidly secured to the thermostat by a screw 64' threaded into the end of the rod with the head of the screw engaging one side of the thermostat. The head of the screw 64' is provided with integral projections 65' extending through the opening in thermostat 65 and bent outwardly to engage the opposite side thereof.

Figure 4:
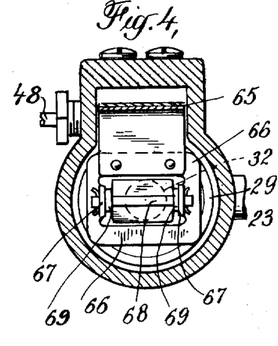
Fig. 4 is a transverse section through the regulator as seen along the line 4—4 of Fig. 2.

A ring-shaped plate 66, shown especially in Fig. 4, is secured to and carried by the free end of the thermostat 65. This plate is fitted with two lugs 67 which are connected by a pin 68 upon which is journalled a clevis 69, which is secured to the free end of the threaded valve stem 32. A coil spring 70 extends between the plate 66 and the valve 29 and normally urges the valve 29 toward closed position. The extent of movement of the valve 29 toward closed position is determined by the position of keys 34, which the valve engages and which move to the left (Fig. 2) when the oven thermostat contracts so as to move the valve 29 toward open position.

In thermostatically controlled ovens, it is common for the temperature of the thermo-sensitive element in the oven to "overshoot", that is, to increase even after the heating effect of the oven heater has been reduced. This may be due to the fact that the hotter gases near the heating element do not circulate immediately to the thermo-sensitive element, which is spaced from the heater. With the construction described, continued expansion of the bellows after valve 29 has engaged its seat, due to "overshoot", is accommodated by the sliding fit between the valve 29 and sleeve 31. If the bellows should move the valve against its seat and thereafter continue to expand, the sleeve 31 will be moved axially through the valve toward the handle so that the keys 34 will move out of engagement with the collar on the valve. The spring 70 will compress to permit this movement of the parts relative to the valve. As the oven cools, the bellows will move the sleeve 31 to the left back into engagement with the valve, and the normal operation of the device will be resumed. It will be apparent that the telescoping action between valve 29 and sleeve 31 also permits setting of the dial from a high temperature position to a position corresponding to a lower temperature. That is, when the oven has been heated to a high temperature for which the dial is set and the valve is substantially closed, turning of the dial to a lower position will screw the sleeve 31 forwardly and move the actuating keys 34 out of engagement with the valve (Fig. 2), whereby the valve will be seated. The keys 34 cannot then move into engagement with the valve to unseat it until the oven has cooled to a temperature approximating the lower temperature for which the dial is set.

The pivoted connection 67, 68 between the compensating thermostat 65 and the valve 29 allows the former to flex freely in response to the temperature changes to which it is subjected. The thermostat 65 is arranged to contract the same amount as the bellows 55 overexpands when the thermostatic fluid in either the bellows or the capillary tube 52, or both responds to local or extraneous heats to which the bellows and capillary tube may be subjected. That is to say, the thermostat 65 subtracts from the movement of the bellows the false movement thereof caused by the response of the thermostatic fluid to local or extraneous heats, so that the valve 29 is unaffected by these false or extraneous heats and is accurately adjusted only in accordance with the temperature of the oven as responded to by the fluid in the bulb 51.

It will accordingly be seen that all effects of local or extraneous heat or cold from any cause whatever are compensated for in the new heat regulator of this invention, which enables the regulator as a whole to be mounted anywhere on a range without regard to the effects of local or extraneous heat thereon. All control devices of this character are subject to some kind of extraneous heat, and it is virtually impossible to mount the regulator at a point where it is unaffected by such extraneous temperatures. For example, when the regulator is mounted on a range in the position illustrated in Fig. 1, the turning on of any one or more of the open stove burners 12 would, by conducted or radiated heat, affect the thermostatic liquid in the bellows 55 so that it would expand and tend to close valve 29 to reduce the supply of fuel to the oven burner 18 and thus reduce the oven temperature when, as a matter of fact, the oven temperature had not changed to require this reduction in fuel supply. Also, the turning off of any one or more of the stove burners 12 would result in cooling the thermostatic liquid in the bellows 55, so that the bellows 55 would contract under the pressure of spring 64 and valve 29 would be opened further to supply more fuel to oven burner 18 when, as a matter of fact, the temperature of the oven had not changed to require this increased flow of fuel. The bellows 55 would also be affected by the temperature of the gas flowing around it through the valve body 20—23, especially during cold weather or when the supply pipes lead from cold earth, and by the temperature of the gas in the manifold 12 as affected by the condition of the stove burners 12. These extraneous temperatures, which would ordinarily cause the regulator to respond, are all compensated for by the thermostat 65, as it also responds to the temperature of the fuel flowing around it.

In placing the new heat regulator of this invention in operation it is mounted in any position on any form of range in the manner described, compensating thermostat 65 having previously been calibrated to contract or expand to produce a movement equal to the over or under expansion of bellows 55 in response to changes in extraneous or local heat, so that the thermostat 65 compensates for such expansion or contraction of bellows 55. The dial on knob 37 is also calibrated to procure different appropriate adjustments of valve 29 when the knob 37 is manipulated by the user to secure predetermined oven temperatures. The adjustment of knob 37 in a clockwise direction to secure a predetermined higher oven temperature results in relative axial movement between the adjusting sleeve 31 and the threaded valve stem 32 to space valve 29 further from its seat, so that it will be closed later by the thermostatic action and consequently at a higher oven temperature. Conversely, if the knob 37 is rotated in a counter-clockwise direction, valve 29 is initially set nearer to its valve seat 30, so that it will be closed earlier at a lower temperature by the thermostatic action.

In any circumstances, all local or extraneous heat, other than the direct heat of the oven which is responded to by the liquid in bulb 51, is compensated for by the bimetallic thermostat 65 in the manner described. By leading the capillary tube 52 from the bulb 51 to any point on the range and making appropriate pipe connections, the regulator may be mounted at any convenient point to suit any form of range or the range manufacturer's or user's convenience.

While a preferred embodiment of this invention is illustrated herein, it is to be understood that the compensating thermostat may be applied to any type of heat regulator and that the invention is not limited by the particular embodiment which is illustrated and described herein.

In the following claims it will be understood that the term "bulb", while applicable to the member 51 illustrated in the drawing, is not limited to a container of the construction there shown, but includes within its scope any liquid container adapted to be inserted in the oven, regardless of its dimensions. For example, the bulb 51 may be a coiled extension of the tube 52 or a straight extension of the tube suitably disposed in the oven and containing sufficient liquid for the previously described operation of the regulator. The term "dial", as used in the claims, is intended to include in its scope any manually adjustable device, such as a handle or the like.

I claim:

1. In a heat control device, the combination of a container, a tube connected thereto, and a filling tube connected at one end to the container and coiled around the first tube adjacent its connection with the container to serve as a guard therefor.

2. In a heat control device for an oven having a burner, the combination of a casing located outside the oven and having a gas inlet and a gas outlet leading to the oven burner, a valve controlling the communication between the gas outlet and gas inlet, an expansible and contractible chamber attached to the casing, a bulb in the oven, a flexible capillary tube connecting the bulb and chamber, a thermo-responsive fluid of high boiling point and negligible vapor pressure at working temperatures in the chamber, bulb, and tube, an actuator between the valve and the chamber including two parts axially threaded together, means for adjusting said parts to change the length of the actuator, and a bi-metallic element in the actuator responsive with the fluid in the chamber to the changes in temperature outside the oven for compensating for the effects of such outside temperature changes on the fluid in the chamber.

3. In a heat control device, the combination of an oven, a casing, a valve therein, a bellows for actuating the valve, a bulb located in the oven and connected to the bellows, a thermo-responsive fluid of high boiling point and negligible vapor pressure at working temperatures in the bulb and bellows, an actuator connected to the bellows, a thermostat carried by the actuator and movable therewith, and connections between the thermostat and the valve, said thermostat being arranged to reduce the movement of the valve by the fluid in response to a rise in extraneous temperatures.

4. In a heat control device, the combination of a compartment to be heated, a heater therefor, means for controlling the heater including a valve member and a valve seat, an expansible and contractible chamber, a bulb in the compartment connected to said chamber, a thermo-responsive liquid filling the bulb and chamber, a connection between the chamber and one of said valve member and seat for moving the valve member and seat relatively toward each other to shut down the heater upon heating of the bulb to a selected temperature, said connection including a thermostat for reducing the relative movement of the valve member and seat by the chamber in accordance with extraneous temperatures, a dial which may be moved to various temperature settings for adjusting one of the valve member and seat relative to the chamber to vary said selected temperature independently of expansion and contraction of the chamber, and means for accommodating movement of the chamber relative to the valve member and seat upon heating of the bulb above the selected temperature after engagement of the valve member and seat.

5. In a thermostatic apparatus for controlling the temperature of a compartment having a heater, the combination of a casing adapted to be mounted outside the compartment, a valve in the casing for regulating the supply of fuel to the heater and including a valve member and a seat therefor, an expansible and contractible chamber in the casing, a bulb connected to the chamber and adapted to be mounted in the compartment, a thermo-responsive liquid filling the bulb and chamber, a sliding connection between the chamber and valve including a thermostatic element through which movement of the chamber is transmitted to the valve, said chamber expanding to close the valve upon a rise in the bulb temperature, and the thermostatic element acting to open the valve in response to a rise in temperature outside the compartment, and a handle outside the casing operatively connected to the valve for adjusting it independently of expansion and contraction of the chamber, said sliding connection accommodating movement of the chamber relative to the handle upon expansion of the chamber after the valve is closed.

6. In a thermostatic apparatus for controlling the temperature of a compartment to be heated, the combination of a casing adapted to be mounted outside the compartment, a valve in the casing through which fuel for heating the compartment is supplied and including a valve member and a seat therefor, an expansible and contractible chamber in the casing, a bulb connected to the chamber and adapted to be mounted in the compartment, a thermo responsive liquid filling the bulb and chamber, a member in the casing operatively connected to the chamber, a sliding connection between said member and the valve, a spring interposed between the member and valve normally urging the valve toward its closed position, said chamber operating through said member and spring to move the valve to a substantially closed position when the bulb is heated to a selected temperature, and a handle outside the casing for adjusting the valve and movable to different positions corresponding to different selected temperatures at which the chamber substantially closes the valve, the said sliding connection accommodating movement of the chamber relative to the valve member upon heating of the bulb above the selected temperature when the valve is closed.

7. In a control device for a compartment having a heater, the combination of a casing adapted to be mounted outside the compartment, an expansible and contractible chamber in the casing, a bulb for insertion in the compartment, a flexible tube connecting the bulb and chamber, a thermo-responsive liquid completely filling the bulb, tube and chamber, a valve in the casing for controlling the supply of fuel to the heater, the valve including a valve member and a seat therefor, an actuating member for the valve having an element extending through the valve and slidable therein, the actuating member being movable into and out of operative relation to the valve, a connection between said element and the chamber through which the chamber advances the actuating member toward the valve to open the same, the connection including a threaded joint, and a compensating thermostat for varying the movement of the actuating member by the chamber in accordance with temperature changes outside the compartment, a spring disposed between the chamber and the valve for closing the valve when the actuating member is moved to a retracted position by the chamber, a shaft extending through the casing connected to the actuating member through a sliding joint and operable to rotate the actuating member and adjust said threaded connection, and a dial connected to one end of the shaft which may be set to different positions corresponding to different temperatures at which the spring substantially closes the valve, said sliding joint permitting movement of said element by the chamber through the valve to move the actuating member out of operative relation to the valve when the bulb is heated above the temperature for which the dial is set.

8. A thermostatic apparatus for controlling the temperature of a compartment to be heated, comprising the combination of a bulb within the compartment, a casing outside the compartment having fuel inlet and outlet ports therein, an expansible and contractible chamber within the casing, a tube connecting the bulb and chamber, a thermo-responsive liquid filling the bulb, tube and chamber, a valve within the casing between the inlet and outlet ports including a valve member and a seat therefor, a connection from the chamber to the valve member whereby expansion and contraction of the chamber operate to position the valve, said connection including an element extending through the valve member and slidable therein to permit expansion of the chamber to continue after the valve has reached its seat, a compression spring disposed between the chamber and valve member normally urging the valve member along said element toward its seat, thermo-responsive means in said connection for compensating for the effect on said chamber of temperature changes outside the compartment, and an operating handle outside the casing for adjusting one of said valve member and seat relative to the chamber without expanding or contracting the chamber, said connection, valve and chamber being arranged in the casing in a substantially coaxial, aligned relation with respect to the handle.

9. A thermostatic apparatus for controlling the temperature of a compartment to be heated comprising the combination of a bulb within the compartment, an expansible and contractible chamber outside the compartment, a tube connecting the bulb and chamber, a thermo-responsive liquid filling the bulb, tube and chamber, a valve outside the compartment including a valve member and seat, a connection from the chamber to the valve whereby expansion and contraction of the chamber operate to position the valve, said connection including two threaded members which are movable relatively for effecting adjustment of said connection and also including a thermostat outside the compartment for compensating for the effect on said chamber of temperature changes outside the compartment, a pair of members in said connection, one of which is movable away from the other to permit expansion of the chamber to continue after the valve has reached its seat, an operating handle outside the compartment connected to one of said two threaded members for adjusting its position relative to the other and thereby effecting adjustment of the connection from the chamber to the valve without moving the chamber, and spring means acting to close the valve and to exert pressure on said liquid, said valve, spring, chamber and con- 10. A thermostatic apparatus for controlling the temperature of a compartment having a heater, comprising the combination of a bulb for insertion in the compartment, a casing adapted to be mounted outside the compartment, an expansible and contractible chamber in the casing, a tube connecting the bulb and chamber, a thermo-responsive liquid filling the bulb, tube and chamber, a control element in the casing movable in one direction to increase the heating effect of the heater and in the opposite direction to shut down the heater, a connection between the chamber and control member whereby expansion and contraction of the chamber operate to position the control member, said connection including two threaded members which are movable relatively for effecting adjustment of said connection and also including two normally engaged elements, one of which is movable away from the other to permit expansion of the chamber to continue after the control member has reached its position for shutting down the heater, a thermostat in said connection through which motion of the chamber is transmitted to said control member, said thermostat operating to compensate for the effect on the chamber of temperature changes outside the compartment, a spring interposed between the chamber and said normally engaged elements and coacting with the connection to urge the control member toward its position for shutting down the heater, the spring being compressible to accommodate movement of one of the elements away from the other, and an operating handle outside the casing connected to one of said two threaded members for adjusting its position relative to the other and thereby effecting adjustment of the connection from the chamber to the control member without moving the chamber, said chamber, threaded members and spring being arranged in the casing in a substantially coaxial, aligned relation with respect to the handle.

11. A thermostatic apparatus for controlling the temperature of a compartment having a heater comprising the combination of a bulb for insertion in the compartment, a casing adapted to be mounted outside the compartment, an expansible and contractible chamber in the casing, a tube connecting the bulb and chamber, a thermo-responsive liquid filling the bulb, tube and chamber, a control element in the casing movable in one direction to increase the heating effect of the heater and in the opposite direction to shut down the heater, a connection from the chamber to the control member whereby expansion and contraction of the chamber operate to position the control member, said connection including a thermostat transmitting motion from the chamber to the control member and operable to compensate for the effect on the chamber of temperature changes outside the compartment, a spring compressible to permit expansion of the chamber to continue after the control member has reached its position for shutting down the heater, the spring normally urging the control member toward its position for shutting down the heater, and an operating handle outside the casing for adjusting the position of said control member independently of the expansion or contraction of the chamber, said chamber and spring being arranged in the casing in substantially coaxial relation with respect to the handle.

12. In a heat control device, the combination of a compartment to be heated, a bulb located in the compartment, a casing outside the compartment, an expansible and contractible chamber in the casing, a flexible tube connecting the bulb and chamber, a thermo-responsive liquid filling the bulb, tube and chamber, a spring in the casing urging the chamber toward its contracted position, a pair of cooperating control elements in the casing movable into and out of engagement to regulate the supply of heat to the compartment, a connection between the chamber and one of the control elements including a pair of members movable into engagement by the chamber to separate said control elements and movable out of engagement to cause the control elements to engage, a dial outside the casing for adjusting the relative positions of said control elements without expanding or contracting the chamber, and thermo-responsive means in the casing for changing the relative positions of the control elements independently of the chamber to compensate for temperature changes outside the compartment, said spring and chamber being arranged in the casing in substantially coaxially, aligned relation with respect to the dial.

13. In a heat control device, the combination of a compartment to be heated, a bulb located within the compartment, a casing located outside the compartment, an expansible and contractible chamber in axial alignment with the casing, a tube connecting the bulb and chamber, a thermo-responsive liquid filling the bulb, tube and chamber, a valve including a valve member and valve seat within the casing, a connection between the chamber and the valve member movable relative to the valve member, spring means constantly forcing a part of the connection against the chamber and urging another part of the connection into operative engagement with one side of the valve member, whereby the connection may be moved out of operative engagement with the valve member when the motion of the valve is arrested by the valve seat, and thermo-responsive means for modifying the length of the connection with respect to the distance between the chamber and the valve seat independently of the expansion and contraction of the chamber.

14. A thermostatic apparatus for controlling the temperature of a compartment to be heated, comprising the combination of a bulb in the compartment, an expansible and contractible chamber outside the compartment, a flexible tube connecting the bulb and chamber, a thermo-responsive liquid filling the bulb, tube and chamber, a valve outside the compartment including a valve member and a seat therefor, a connection from the chamber to one of the valve member and seat whereby expansion and contraction of the chamber operate to position the valve, said connection including a member slidable relative to the valve to permit expansion of the chamber to continue after the valve has reached its seat, an operating handle outside the compartment for adjusting the valve independently of the expansion and contraction of the chamber, spring means for urging the valve toward its closed position and for exerting a pressure on said liquid, and thermo-responsive means outside the compartment cooperating with said connection for adjusting the valve independently of said chamber and handle to compensate for the effect on said chamber of temperature changes outside the compartment, said connection, valve, and spring being arranged outside the compartment in a substantially coaxial, aligned relation with respect to the handle.

15. The combination with a range having an oven, a heater therein and a heater exterior to the oven, of a casing outside the oven adjacent to the exterior heater, an expansible and contractible chamber mounted on the casing, a bulb in the oven, a flexible tube connecting the bulb and chamber, a liquid of high boiling point and negligible vapor pressure at working temperatures filling the bulb, tube and chamber, a spring acting upon the chamber to maintain the liquid therein under pressure, a member in the casing for controlling the heater in the oven, a connection from the chamber to said member, means for permitting continuance of the expansion of the chamber after such expansion has moved the member to a position in which its movement is arrested, thermostatic means governing the actuation of said member by the chamber to compensate for the effect on the chamber of heat emanating from said exterior heater, and a manual adjusting means located outside the casing and operable to effect adjustment as desired of the effect of operation of said member by the chamber without affecting the thermostatic operation of either the chamber or said thermostatic means.

16. The combination with a range having an oven, a heater therein and a heater exterior to the oven, of a casing outside the oven adjacent to the exterior heater, an expansible and contractible chamber mounted on the casing, a bulb in the oven, a flexible tube connecting the bulb and chamber, a liquid of high boiling point and negligible vapor pressure at working temperatures filling the bulb, tube and chamber, a spring acting upon the chamber to maintain the liquid therein under pressure, a member in the casing for controlling the heater in the oven, a connection from the chamber to said member, means for permitting continuance of the expansion of the chamber after such expansion has moved the member to a position in which its movement is arrested, thermostatic means governing the actuation of said member by the chamber to compensate for the effect on the chamber of heat emanating from said exterior heater, and a manual adjusting means located outside the casing and operable to effect adjustment as desired of the effect of operation of said member by the chamber without affecting the thermostatic operation of either the chamber or said thermostatic means, said chamber, spring and at least part of said connection being arranged in the casing in a substantially coaxial, aligned relation with respect to said adjusting means.

17. The combination with a range having an oven, a heater therein and a heater exterior to the oven, of a casing outside the oven adjacent to the exterior heater, an expansible and contractible chamber mounted on the casing, a bulb in the oven, a flexible tube connecting the bulb and chamber, a liquid of high boiling point and negligible vapor pressure at working temperatures filling the bulb, tube and chamber, a spring acting upon the chamber to maintain the liquid therein under pressure, a member in the casing for controlling the heater in the oven, a connection from the chamber to said member, means for permitting continuance of the expansion of the chamber after such expansion has moved the member to a position in which its movement is arrested, and a manual adjusting means located outside the casing and operable to effect adjustment as desired of the effect of operation of said member by the chamber without affecting the thermostatic operation of the chamber, said adjusting means, chamber and spring and a part of said connection being arranged in a substantially straight line relation with the adjusting means at one end.

18. In a thermostatic apparatus for controlling the temperature of a compartment to be heated, the combination of a bulb in the compartment, a casing outside the compartment, an expansible and contractible chamber in the casing, a flexible tube connecting the bulb and chamber, a thermo-responsive liquid filling the bulb, tube and chamber, an adjusting handle outside the casing, actuating devices movable by said handle and interposed between the handle and said chamber, a valve operable by said actuating devices and through which fuel for heating the compartment is supplied, and a thermostatic element in the casing and connecting said actuating devices to the chamber for transmitting movement of the chamber to the valve, said chamber acting to move the valve toward closed position upon a rise in the bulb temperature, and the thermostatic element acting to move the valve toward open position in response to rise in temperature outside the compartment.

19. A thermostatic apparatus for controlling the temperature of a compartment to be heated, comprising the combination of a bulb within the compartment, a casing outside the compartment having fuel inlet and outlet ports therein, an expansible and contractible chamber within the casing, a tube connecting the bulb and chamber, a thermo-responsive liquid filling the bulb, tube and chamber, a valve within the casing between the inlet and outlet ports thereof, a connection from the chamber to the valve whereby expansion and contraction of the chamber operate to position the valve, said connection including two members, one movable relatively to the other to permit expansion of the chamber to continue after the valve has reached its seat and also including two threaded members which are movable relatively for effecting adjustment of the said connection, a bimetallic element included in said connection for compensating for the effect of changes of temperature outside the compartment upon said chamber, and an operating handle outside the casing connected to one of the said two threaded members for adjusting its position relative to the other and thereby effecting adjustment of the connection from the chamber to the valve without affecting the chamber or said bimetallic element.

20. A thermostatic apparatus for controlling the temperature of a compartment to be heated, comprising the combination of a bulb in the compartment, a casing outside the compartment, an expansible and contractible chamber in the casing, a tube connecting the bulb and chamber, a thermo-responsive liquid filling the bulb, tube and chamber, a valve in the casing including a valve member and a seat therefor, a connection from the chamber to one of the valve member and seat whereby expansion and contraction of the chamber operate to position the valve, said connection including an element slidable relative to the valve member to permit expansion of the chamber to continue after the valve member has reached its seat, an operating handle for adjusting the valve independently of the expansion and contraction of the chamber, a spring cooperating with said sliding element normally urging the valve toward its closed position, and thermo-responsive means in the casing cooperating with said connection for adjusting the valve without affecting said chamber and handle to compensate for the effect on said chamber of temperature changes outside the compartment.

21. A thermostatic apparatus for controlling the temperature of a compartment to be heated, comprising the combination of a bulb in the compartment, a casing outside the compartment having fuel inlet and outlet ports, an expansible and contractible chamber in the casing, a tube connecting the bulb and chamber, a thermo-responsive liquid filling the bulb, tube and chamber, a valve in the casing between the inlet and outlet ports thereof including a valve member and a seat therefor, a connection from the chamber to one of the valve member and seat whereby expansion and contraction of the chamber operate to position the valve, said connection including an element slidable relative to the valve member to permit expansion of the chamber to continue after the valve member has reached its seat and also including two threaded members which are movable relatively for effecting adjustment of said connection, thermo-responsive means included in said connection for compensating for the effect of temperature changes outside the compartment upon said chamber, an operating handle outside the casing, and a sliding connection between the handle and said first connection for adjusting the position of one of said two threaded members relative to the other and thereby effecting adjustment of the connection from the chamber to the valve without expanding or contracting the chamber.

22. In a heat control device, the combination of a compartment to be heated, a bulb located in the compartment, a casing outside the compartment, an expansible and contractible chamber in the casing, a flexible tube connecting the bulb and chamber, a thermo-responsive liquid filling the bulb, tube and chamber, a spring in the casing urging the chamber toward its contracted position, a pair of cooperating control elements in the casing movable into and out of engagement to regulate the supply of heat to the compartment, a connection between the chamber and one of the control elements including a pair of members movable into engagement under the control of the chamber to separate said control elements and out of engagement to permit the control elements to engage, a dial outside the casing for adjusting the relative positions of said control elements without expanding or contracting the chamber, and thermo-responsive means for changing the relative positions of the control elements without affecting the chamber to compensate for temperature changes outside the compartment.

23. In a regulator for a compartment having a heater, the combination of a bulb for insertion in the compartment, a casing adapted to be mounted outside the compartment, inlet and outlet ports in the casing, an expansible and contractible chamber in the casing, a flexible tube connecting the bulb and chamber, a thermo-responsive liquid filling the bulb, tube and chamber, a valve member and a seat therefor between the inlet and outlet ports, actuating means extending from the chamber to the valve member and including a member extending through an opening in the valve member and slidable therein, said actuating means also including a shoulder movable into engagement with the valve member to unseat the same and substantially seal said opening, spring means normally urging the valve member toward said shoulder and urging the chamber toward its contracted position, a shaft extending through the casing for adjusting the relative positions of the valve member and seat independently of expansion and contraction of the chamber, a dial on one end of the shaft, and thermo-responsive means in the casing for adjusting the relative positions of the valve member and seat independently of the chamber to compensate for temperature changes outside the compartment.

24. In a thermostatic apparatus for controlling the temperature of a compartment having a heater, the combination of a bulb for insertion in the compartment, a casing outside the compartment, an expansible and contractible chamber in the casing, a tube connecting the bulb and chamber, a thermo-responsive liquid filling the bulb, tube and chamber, a pair of cooperating control members in the casing one of which is movable relative to the other in one direction to increase the heating effect of the heater and in the opposite direction to shut down the heater, a compensating thermostat including two different metals having different coefficients of expansion, said thermostat being located in the casing, a connection between the chamber and one of said control members including at least a part of said compensating thermostat through which motion of the chamber is transmitted to said control member, said compensating thermostat being operable to compensate for the effect upon the chamber of temperature changes outside the compartment, and manual adjusting means for varying the relative positions of said control members without affecting said chamber or compensating thermostat.

25. A thermostatic apparatus for controlling the temperature of a compartment having a heater, comprising the combination of a bulb for insertion in the compartment, an expansible and contractible chamber outside the compartment, a flexible tube connecting the bulb and chamber, a thermo-responsive liquid filling the bulb, tube and chamber, a pair of elements for controlling the heater one of which is movable relative to the other in a direction for varying the heating effect of the heater, a connection from the chamber to said movable element whereby expansion and contraction of the chamber operate to position that element, said connection including a pair of cooperating members controlled by the chamber and movable into engagement to separate said control elements and movable out of engagement to permit expansion of the chamber to continue after said movable control element has reached a position for shutting down the heater, and a spring opposing movement of the chamber to disengage said cooperating members and acting to engage the members in response to contraction of said chamber.

26. In combination with a gas range having an oven and an exterior heater, a casing mounted adjacent to the exterior heater, inlet and outlet ports in the casing, the outlet port supplying fuel to the oven heater, a valve in the casing controlling the passage of fuel from the inlet to the outlet port, a bulb in the oven, an expansible and contractible chamber mounted in the casing for adjusting the valve, a flexible tube connecting the bulb and chamber, a thermo-responsive liquid completely filling the bulb, tube and chamber, said fluid being of high boiling point and negligible vapor pressure at working temperatures, compensating means located in the casing and responsive with the fluid in the chamber to changes in temperature resulting from operation of said exterior heater, said compensating means including two metals having different coefficients of expansion and operable to adjust the relative positions of said control means and chamber without affecting the chamber, and manual adjusting means mounted on the casing and operable from outside the casing to adjust the valve independently of expansion or contraction of said chamber.

27. In combination with a range having a heater in the oven and an exterior heater, a bulb in the oven, an expansible and contractible chamber outside the oven, a flexible tube connecting the bulb and chamber, a thermo-responsive liquid completely filling the bulb, tube and chamber, the fluid being of high boiling point and negligible vapor pressure at working temperatures, means outside the oven for controlling the oven heater, a connection between the chamber and control means, compensating means located outside the oven adjacent said chamber and responsive with the fluid in the chamber to changes in temperature resulting from operation of said exterior heater, said compensator including two metals having different coefficients of expansion and operable to adjust the relative positions of said control means and chamber without affecting the chamber, and a dial operatively connected to the control means for moving the same relative to the chamber independently of expansion and contraction of the chamber.

EDWARD L. FONSECA.

CERTIFICATE OF CORRECTION.

Patent No. 2,101,735.　　　　　　　　　　December 7, 1937.

EDWARD L. FONSECA.

It is hereby certified that error appears in the printed specification of the above numbered patent requiring correction as follows: Page 3, second column, line 8, after the period insert the following sentence:

The push rod 63, the clevis 69, the plate 66, the valve stem 32, and the sleeve 31 jointly constitute an actuator extending between the bellows 55 and the valve 29 and including the compensating thermostat 65.;

and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)

vapor pressure at working temperatures, compensating means located in the casing and responsive with the fluid in the chamber to changes in temperature resulting from operation of said exterior heater, said compensating means including two metals having different coefficients of expansion and operable to adjust the relative positions of said control means and chamber without affecting the chamber, and manual adjusting means mounted on the casing and operable from outside the casing to adjust the valve independently of expansion or contraction of said chamber.

27. In combination with a range having a heater in the oven and an exterior heater, a bulb in the oven, an expansible and contractible chamber outside the oven, a flexible tube connecting the bulb and chamber, a thermo-responsive liquid completely filling the bulb, tube and chamber, the fluid being of high boiling point and negligible vapor pressure at working temperatures, means outside the oven for controlling the oven heater, a connection between the chamber and control means, compensating means located outside the oven adjacent said chamber and responsive with the fluid in the chamber to changes in temperature resulting from operation of said exterior heater, said compensator including two metals having different coefficients of expansion and operable to adjust the relative positions of said control means and chamber without affecting the chamber, and a dial operatively connected to the control means for moving the same relative to the chamber independently of expansion and contraction of the chamber.

EDWARD L. FONSECA.

CERTIFICATE OF CORRECTION.

Patent No. 2,101,735.     December 7, 1937.

EDWARD L. FONSECA.

It is hereby certified that error appears in the printed specification of the above numbered patent requiring correction as follows: Page 3, second column, line 8, after the period insert the following sentence:

> The push rod 63, the clevis 69, the plate 66, the valve stem 32, and the sleeve 31 jointly constitute an actuator extending between the bellows 55 and the valve 29 and including the compensating thermostat 65.;

and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,101,735. December 7, 1937.

EDWARD L. FONSECA.

It is hereby certified that error appears in the printed specificati of the above numbered patent requiring correction as follows: Page 3, secc column, line 8, after the period insert the following sentence:

> The push rod 63, the clevis 69, the plate 66, the valve stem 32, and the sleeve 31 jointly constitute an actuator extending between the bellows 55 and the valve 29 and including the compensating thermostat 65.;

and that the said Letters Patent should be read with this correction thei in that the same may conform to the record of the case in the Patent Offic Signed and sealed this 22nd day of February, A. D. 1938.

(Seal)

Henry Van Arsdale,
Acting Commissioner of Patent